Aug. 14, 1928.

J. W. CALHOUN 1,681,027

BOTTOM FOR WATER METERS

Filed Oct. 24, 1922

Inventor

John W. Calhoun

By Lloyd W. Patch his Attorney

Patented Aug. 14, 1928.

1,681,027

UNITED STATES PATENT OFFICE.

JOHN W. CALHOUN, OF CHESTER, PENNSYLVANIA.

BOTTOM FOR WATER METERS.

Application filed October 24, 1922. Serial No. 596,692.

This invention relates to a two-piece bottom for water meters and relates particularly to a structure of this character intended for use with meters installed in cold climates and in other places where there is possibility of freezing.

An object of my invention is to provide a bottom closure for a water meter which is made up of two members, a finished bottom closure member and a breakable retaining plate, and which has the members so fitted that in case of freezing or other expansion within the meter casing, the retaining plate will break to permit further expansion without injury to the casing or working parts.

A further object is to so construct the two members that breaking or fracturing of the retaining plate does not in any wise injure the bottom closure member, and that repairs can be made and the meter restored to its normal condition by substituting a new retaining plate.

Yet another object resides in so constructing the bottom closure member that this portion will not be injured by the freezing or expansion within the meter casing, thus permitting the manufacture of these parts of bronze or other more expensive metal and a proper and accurate finishing and machining to provide a proper seat, while the retaining plate can be made as a rough iron casting or can be otherwise cheaply constructed to thus be readily and cheaply replaced.

With the above and other objects in view which will be apparent to those skilled in the art, my present invention includes certain novel features of construction and combination of parts which will now be set forth.

Figure 1:
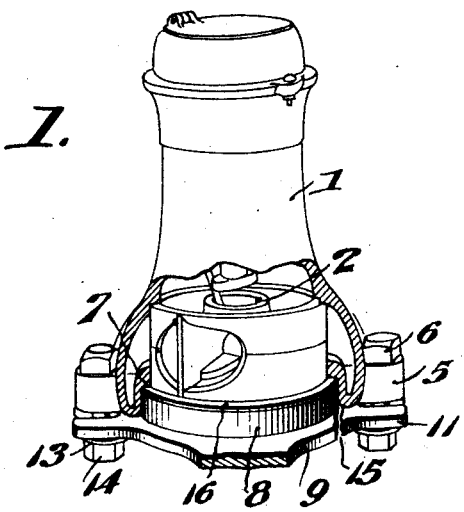
Figure 1 is a view in perspective of a meter with parts in section to show my improved two-piece bottom applied thereto.
Figure 2:
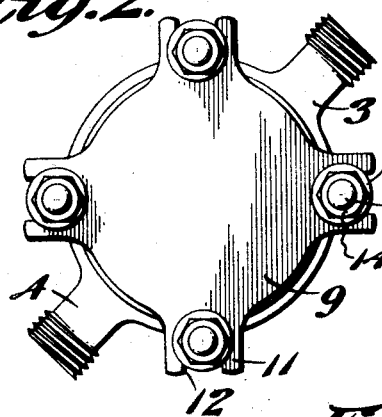
Fig. 2 is a view in elevation of the lower end of the meter illustrating my improved meter bottom fitted thereon.
Figure 3:
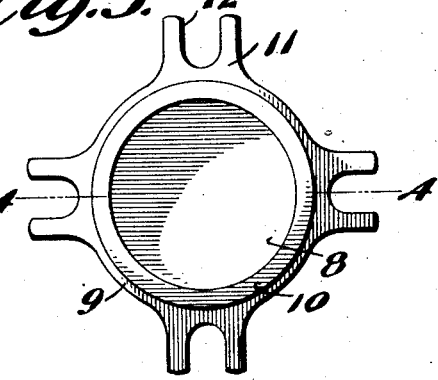
Fig. 3 is a top plan view showing the fitting of the two members in their relative positions.
Figure 4:
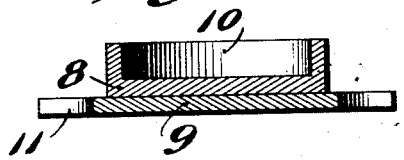
Fig. 4 is a sectional view on the line 4—4 of Fig. 3.

In the present instance I have shown my improvements applied upon a particular form of meter casing, but it will be appreciated that the structure is capable of adaptation to any form of casing and in conjunction with various types of working parts. In this disclosure the meter casing is indicated at 1, and the working parts are generally shown at 2. The casing 1 has the two threaded connecting nipples 3 and 4 for intake and discharge connections, and the bolt ears 5 are provided adjacent the bottom of the casing and are bored to receive clamping bolts 6. The casing has a machine seat 7 around the open lower end.

My improved meter bottom is made up of a bottom closure member 8 and a breakable retaining plate 9. The closure member 8 has a flange 10 on its inner face machined and finished to fit the seat 7 of the meter casing, and otherwise this member 8 is shaped and is finished to give the best results in use and to adapt the same for permanent use. The member 8 can be made of bronze, heavy cast iron, or other suitable metal which can be finished to give a proper fit and which will not be likely to be broken by freezing or other expansion pressure within the casing.

The retaining plate 9 is provided with the extending lugs or ears 11 provided with openings 12 to receive the clamping bolts 6, and these lugs or ears 11 are spaced to correspond with the spacing of the bolt ears 5, any desired number of bolt ears and corresponding lugs being provided upon the casing and the retaining plate. The body portion of the retaining plate is made of sufficient size to give an even clamping bearing upon all parts of the bottom closure member 8, and when this member 8 and the plate 9 are fitted in place the washers 13 and nuts 14 fitted on the clamping bolts 6 will secure the parts in the proper casing closing relation.

When my improved structure is fitted for use as above described, freezing or other expansive pressure within the casing 1 is transmitted through the bottom closure member 8 to the retaining plate 9, and as this plate is made of cast iron, or other frangible and readily breakable material, the expansive pressure will cause the lugs 11 to be broken, as indicated at 15 in Fig. 1, and the pressure within the casing will thus be relieved. If desired a packing gasket 16 can be fitted between the finished edge of flange 10 and the seat 7, and other mechanical refinements may be resorted to.

While I have herein described only certain specific embodiments and have suggested a few possible modifications, it will be appreciated that in practice I do not limit myself to such specific details, but may resort to any number of modifications falling within the scope of this invention as defined in the appended claim.

I claim:

A bottom for water meter casings to prevent damage from expansion within the casing due to freezing adapted to be used upon a meter casing having an open bottom and provided with fastening bolts around the opening, said bottom comprising a closure member machined and finished for permanent use to fit within and close the bottom opening of the meter case, and a retaining plate of substantially non-resilient frangible material provided with a central portion to extend entirely over and hold against the outer side of the closure member and having radially extending breakable lug arms to receive the fastening bolts to clamp the retaining plate rigidly against the closure member.

In testimony whereof I hereunto affix my signature.

JOHN W. CALHOUN.